United States Patent
Blades et al.

(10) Patent No.: US 9,909,304 B2
(45) Date of Patent: *Mar. 6, 2018

(54) SOUND DAMPING WALLBOARD AND METHOD OF FORMING A SOUND DAMPING WALLBOARD

(71) Applicant: National Gypsum Properties, LLC, Charlotte, NC (US)

(72) Inventors: Michael N. Blades, Indian Land, SC (US); John M. Watt, Charlotte, NC (US); John E. Yakowenko, Waxhaw, NC (US); Todd D. Broud, Charlotte, NC (US); Keith R. O'Leary, Charlotte, NC (US); Stephen A. Cusa, Downingtown, PA (US); Mauricio Quiros, Charlotte, NC (US); Brian G. Randall, Charlotte, NC (US); Richard P. Weir, Indian Trail, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/293,184

(22) Filed: Oct. 13, 2016

(65) Prior Publication Data

US 2017/0037617 A1    Feb. 9, 2017

Related U.S. Application Data

(63) Continuation of application No. 15/017,458, filed on Feb. 5, 2016, now Pat. No. 9,512,613.

(Continued)

(51) Int. Cl.
*E04B 1/86* (2006.01)
*E04B 1/84* (2006.01)
(Continued)

(52) U.S. Cl.
CPC .............. *E04B 1/8409* (2013.01); *B32B 9/06* (2013.01); *B32B 37/12* (2013.01); *B32B 37/14* (2013.01);
(Continued)

(58) Field of Classification Search
CPC ....... G10K 11/168; E04B 1/8409; E04B 1/86; B32B 9/06; B32B 37/12; B32B 37/14; B32B 38/10
(Continued)

(56) References Cited

U.S. PATENT DOCUMENTS 2,045,311 A    6/1936 Roos
2,045,312 A    6/1936 Roos
(Continued)

FOREIGN PATENT DOCUMENTS

JP    2004042557    2/2004

OTHER PUBLICATIONS

Product Info on QuietGlue QG-311 from Quiet Solution, 2005, 2 pages.

*Primary Examiner* — Forrest M Phillips
(74) *Attorney, Agent, or Firm* — Dority & Manning, P.A.

(57) ABSTRACT

A sound damping wallboard and methods of forming a sound damping wallboard are disclosed. The sound damping wallboard includes a gypsum layer having a first side with a first gypsum surface, a first encasing layer at least partially covering the first gypsum surface to form a first encasing layer portion, and a sound damping layer on the first side covering at least part of the first encasing layer portion.

22 Claims, 6 Drawing Sheets

Related U.S. Application Data

(60) Provisional application No. 62/112,547, filed on Feb. 5, 2015.

(51) Int. Cl.

| | | |
|---|---|---|
| *B32B 9/06* | (2006.01) | |
| *B32B 37/12* | (2006.01) | |
| *B32B 37/14* | (2006.01) | |
| *B32B 38/10* | (2006.01) | |
| *G10K 11/168* | (2006.01) | |
| *F16B 11/00* | (2006.01) | |

(52) U.S. Cl.
CPC ............... *B32B 38/10* (2013.01); *E04B 1/86* (2013.01); *G10K 11/168* (2013.01); *B32B 2307/102* (2013.01); *B32B 2315/18* (2013.01); *B32B 2607/00* (2013.01); *E04B 2001/8461* (2013.01); *F16B 11/006* (2013.01)

(58) Field of Classification Search
USPC ........................................................ 181/290
See application file for complete search history.

(56) References Cited

U.S. PATENT DOCUMENTS

| | | | |
|---|---|---|---|
| 5,125,475 A | 6/1992 | Ducharme et al. | |
| 5,258,585 A | 11/1993 | Juriga | |
| 5,907,932 A | 6/1999 | LeConte et al. | |
| 5,975,238 A | 11/1999 | Fuchs et al. | |
| 6,640,507 B1 | 11/2003 | Leconte | |
| 6,901,713 B2 | 6/2005 | Axsom | |
| 7,181,891 B2* | 2/2007 | Surace ................ B32B 7/12 52/309.9 | |
| 7,344,772 B2 | 3/2008 | Rehfeld et al. | |
| 7,745,005 B2 | 6/2010 | Tinianov | |
| 7,798,287 B1 | 9/2010 | Surace et al. | |
| 7,799,410 B2 | 9/2010 | Tinianov | |
| 7,883,763 B2 | 2/2011 | Tinianov | |
| 7,908,818 B2 | 3/2011 | Tinianov et al. | |
| 7,909,136 B2 | 3/2011 | Surace et al. | |
| 7,921,965 B1* | 4/2011 | Surace ................ B32B 7/12 181/285 | |
| 8,028,800 B2 | 10/2011 | Ravnaas | |
| 8,029,881 B2 | 10/2011 | Surace et al. | |
| 8,181,417 B2 | 5/2012 | Surace et al. | |
| 8,181,738 B2 | 5/2012 | Tinianov et al. | |
| 8,397,864 B2 | 3/2013 | Tinianov et al. | |
| 8,424,251 B2 | 4/2013 | Tinianov | |
| 8,495,851 B2 | 7/2013 | Surace et al. | |
| 8,900,691 B2 | 12/2014 | Rehfeld et al. | |
| 8,926,855 B2 | 1/2015 | Thomas et al. | |
| 9,033,102 B2 | 5/2015 | Payot et al. | |
| 9,045,898 B2 | 6/2015 | Ravnaas | |
| 9,102,122 B2 | 8/2015 | Rehfeld et al. | |
| 9,157,242 B2 | 10/2015 | Thomas et al. | |
| 9,200,438 B2 | 12/2015 | Blanchard et al. | |
| 9,334,662 B2 | 5/2016 | Spanton et al. | |
| 9,387,649 B2 | 7/2016 | Tinianov et al. | |
| 9,388,568 B2 | 7/2016 | Tinianov | |
| 9,446,458 B2 | 9/2016 | Huchet | |
| 9,487,952 B2 | 11/2016 | Nilsson et al. | |
| 9,499,975 B2 | 11/2016 | Thomas et al. | |
| 9,512,613 B2 | 12/2016 | Blades et al. | |
| 9,561,601 B2 | 2/2017 | Santamaria et al. | |
| 9,580,901 B2 | 2/2017 | Payot et al. | |
| 9,637,913 B2 | 5/2017 | Ravnaas | |
| 9,733,173 B2 | 8/2017 | Rehfeld et al. | |
| 2003/0070367 A1* | 4/2003 | Gelin .................. E04B 2/7412 52/144 | |
| 2004/0026002 A1 | 2/2004 | Weldon et al. | |
| 2004/0219322 A1* | 11/2004 | Fisher .................. B32B 15/06 428/40.1 | |
| 2005/0080193 A1* | 4/2005 | Wouters ................ C09J 133/04 525/191 | |
| 2005/0196608 A1* | 9/2005 | Wouters ................ C09J 133/02 428/355 R | |
| 2005/0255318 A1 | 11/2005 | Czerny | |
| 2006/0165977 A1 | 7/2006 | Rehfeld et al. | |
| 2006/0182978 A1 | 8/2006 | Leroy et al. | |
| 2007/0137139 A1 | 6/2007 | Tierney et al. | |
| 2008/0178544 A1 | 7/2008 | Clark et al. | |
| 2008/0251198 A1* | 10/2008 | Tinianov .................. B32B 27/14 156/291 | |
| 2008/0264721 A1* | 10/2008 | Tinianov .................... E04B 1/86 181/290 | |
| 2009/0004448 A1* | 1/2009 | Tinianov .................. B32B 15/08 428/212 | |
| 2009/0107059 A1 | 4/2009 | Kipp et al. | |
| 2009/0239429 A1 | 9/2009 | Kipp et al. | |
| 2009/0283359 A1 | 11/2009 | Ravnaas | |
| 2010/0258378 A1* | 10/2010 | Ravnaas .................... E04B 1/86 181/286 | |
| 2010/0261023 A1 | 10/2010 | Ravnaas | |
| 2010/0295331 A1 | 11/2010 | Rehfeld et al. | |
| 2011/0076470 A1 | 3/2011 | Zaveri | |
| 2012/0052274 A1 | 3/2012 | Rehfeld et al. | |
| 2012/0073899 A1 | 3/2012 | Fournier et al. | |
| 2013/0240111 A1* | 9/2013 | Tinianov .................... E04B 1/86 156/60 | |
| 2013/0240291 A1 | 9/2013 | Tinianov | |
| 2013/0316158 A1 | 11/2013 | Rehfeld et al. | |
| 2014/0273687 A1 | 9/2014 | Garvey et al. | |
| 2014/0290165 A1 | 10/2014 | Spanton et al. | |
| 2015/0218804 A1 | 8/2015 | Payot et al. | |
| 2015/0283959 A1 | 10/2015 | Rehfeld et al. | |
| 2015/0322670 A1 | 11/2015 | Hotchin et al. | |
| 2016/0230395 A1 | 8/2016 | Cusa et al. | |
| 2017/0015085 A1 | 1/2017 | Chuda et al. | |
| 2017/0165945 A1 | 6/2017 | Payen et al. | |
| 2017/0210097 A1 | 7/2017 | Payen et al. | |

* cited by examiner

SOUND DAMPING WALLBOARD AND METHOD OF FORMING A SOUND DAMPING WALLBOARD

This application is a continuation of U.S. application Ser. No. 15/017,458, filed Feb. 5, 2016, which claims the benefit of U.S. Provisional Application No. 62/112,547, filed Feb. 5, 2015, both of which are hereby incorporated by reference in their entirety.

BACKGROUND

A building is typically constructed with walls having a frame comprising vertically oriented studs connected by horizontally oriented top and bottom plates. The walls often include one or more gypsum wallboards fastened to the studs and/or plates on each side of the frame or, particularly for exterior walls, one or more gypsum wallboards fastened to the studs and/or plates on one side of the frame with a non-gypsum based sheathing attached to an exterior side of the frame. A ceiling of the building may also include one or more gypsum wallboards oriented horizontally and fastened to joists, studs, or other structural members extending horizontally in the building. Walls and ceilings of this construction often have poor acoustical performance and a low sound transmission class (STC) rating, which results in noise pollution, lack of privacy, and similar issues in the various spaces of the building.

One method to improve acoustical performance of the walls and ceilings is to install insulation in the cavities of the walls before attaching wallboards to the wall frame. Other methods include the use of perpendicular framing and/or rubber sheets, clips, or panels attached to the frame during wall or ceiling construction. A recent method incorporates a sound damping adhesive between wallboards to create a single panel. However, this recent method to improve wall or ceiling acoustical performance requires using a wallboard panel that is difficult to cut due to the two layers of paper or encasing material in the middle of the single panel. Further, attempts to couple two wallboards not having paper or encasing material on the inside faces of the wallboards have been problematic due to the inability of the sound damping layer adhesive to bond with the gypsum material of each wallboard. Such attempts have led to misalignment, warping, and pulling apart of the two wallboards.

Therefore, there exists a need for a sound damping wallboard of a single panel structure that is structurally robust with superior STC performance while requiring minimal effort to cut or score and snap for installation.

SUMMARY

In accordance with an embodiment of the present disclosure, a sound damping wallboard is provided having a gypsum layer having a first side with a first gypsum surface, a first encasing layer at least partially covering the first gypsum surface to form a first encasing layer portion, and a sound damping layer on the first side covering at least part of the first encasing layer portion.

In accordance with an embodiment of the present disclosure, a method of forming a sound damping wallboard is provided. The method includes the steps of providing a first gypsum layer having a first side with a first gypsum surface, and a first encasing layer covering the first gypsum surface, and removing at least part of the first encasing layer to expose the first gypsum surface, form a first gypsum surface portion on the first side, and allow application of a sound damping layer to the first side to cover at least part of the first gypsum surface portion.

In accordance with an embodiment of the present disclosure, a sound damping wallboard is provided having a gypsum layer having a first side with a first gypsum surface and a second side with a second gypsum surface, a first encasing layer at least partially covering the first gypsum surface, a second encasing layer at least partially covering the second gypsum surface opposite the first gypsum surface, and a sound damping layer at the first side of the gypsum layer and at least partially covering the first encasing layer portion.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
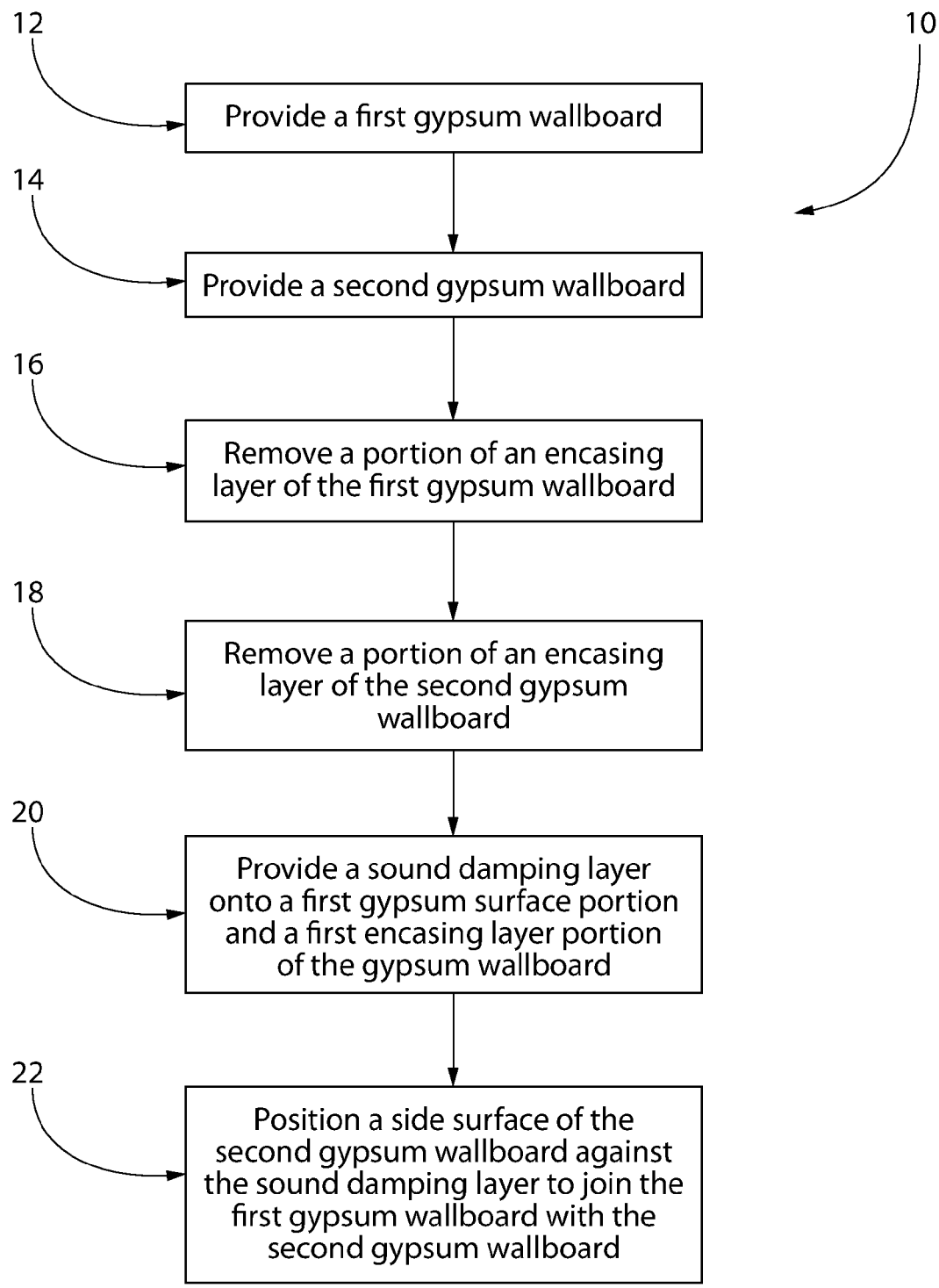
FIG. 1 illustrates a method of forming a sound damping wallboard in accordance with aspects of the present disclosure.
Figure 2:
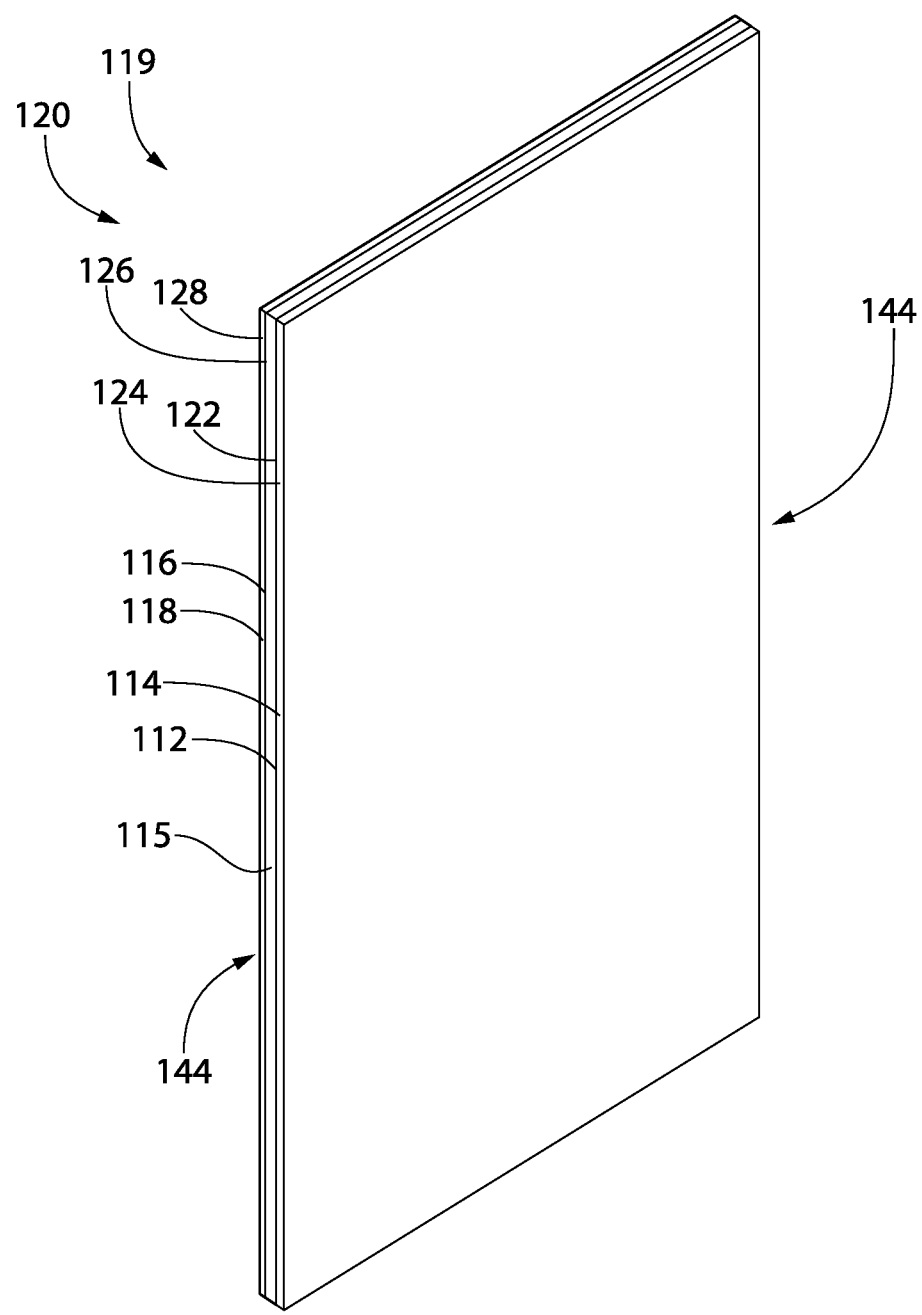
FIG. 2 is a perspective view of a gypsum wallboard in accordance with aspects of the present disclosure.
Figure 3:
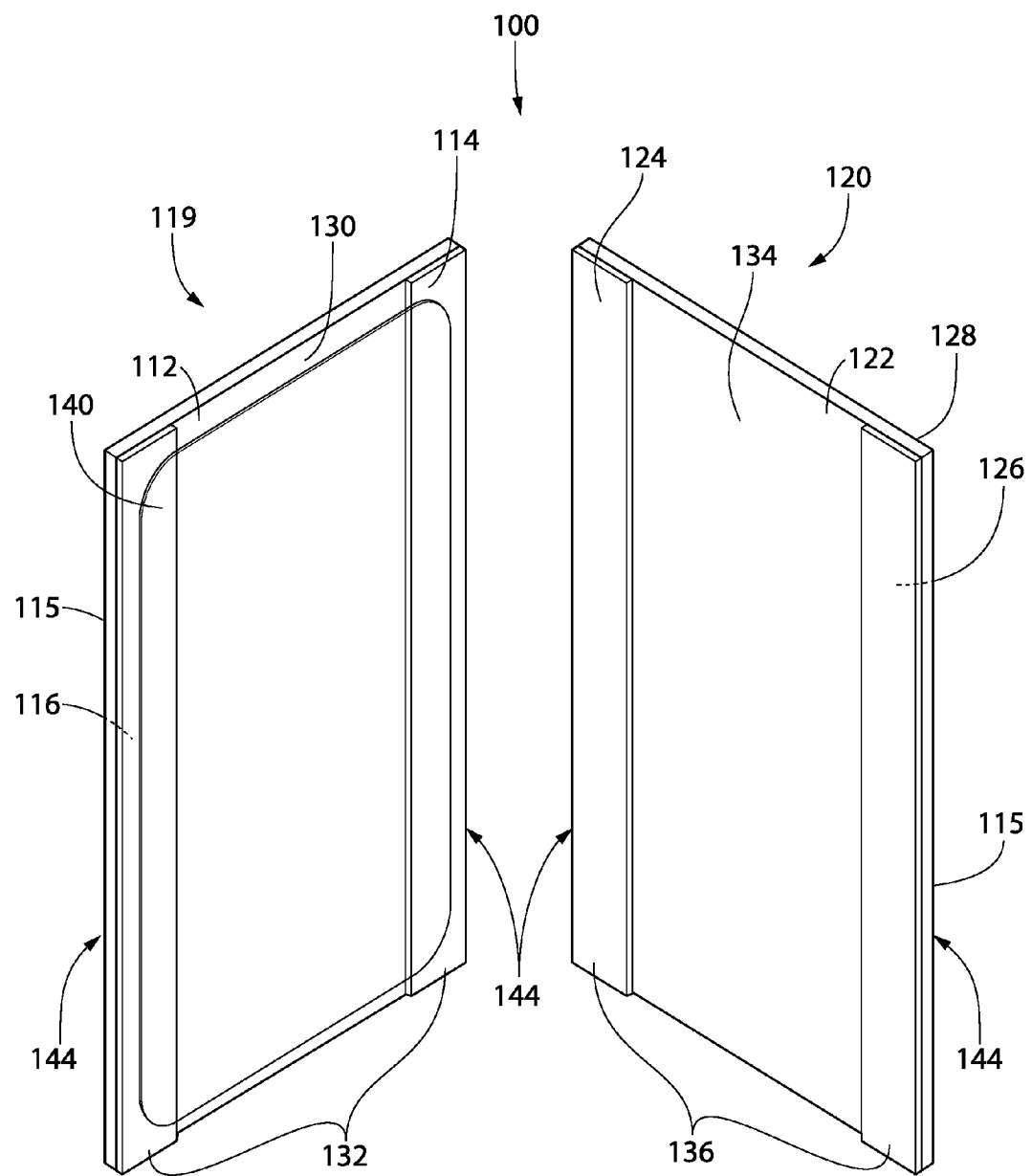
FIG. 3 is an exploded view of a sound damping wallboard formed in accordance with aspects of the present disclosure.

Referring now to FIGS. 1-3, a method 10 of forming a sound damping wallboard 100 and a sound damping wallboard 100 formed by the method 10 are provided. The method 10 illustrated in FIG. 1 includes providing, at step 12, a first gypsum wallboard 119. As shown in FIG. 2, the first gypsum wallboard 119 includes a gypsum layer or core 115 having a first side with a first gypsum surface 112 covered by a first encasing layer 114. First gypsum wallboard 119 further includes a second side with a second gypsum surface 116 opposite the first gypsum surface 112, and covered by a second encasing layer 118. Thus, gypsum layer 115 is disposed between the first encasing layer 114 and the second encasing layer 118. The gypsum layer 115 of one or more embodiments is formed from a gypsum slurry that is laid onto the second encasing layer 118. In such an embodiment, the second encasing layer 118 is referred to as the face encasing layer and the first encasing layer 114 is referred to as the back encasing layer. In one embodiment, the first encasing layer 114 may be wrapped around the gypsum layer 115 to enclose the gypsum layer and form a single panel with encasing layers on both the face and back side and along both long edges 144.

As illustrated in FIG. 1, the method 10 of one or more embodiments of the present disclosure further includes providing, at step 14, a second gypsum wallboard 120. Referring again to FIG. 2, the first gypsum wallboard 119 may be identical to the second gypsum wallboard 120. In another embodiment, the first gypsum wallboard 119 and the second gypsum wallboard 120 are identical in all aspects except the thickness of each panel. As such, the wallboard depicted in FIG. 2 and described above with reference to FIG. 2 is referenced for each of the first gypsum wallboard 119 and the second gypsum wallboard 120 of the present disclosure. The second gypsum wallboard 120 includes a gypsum layer 115 having a third side with a third gypsum surface 122 covered by a third encasing layer 124. Second gypsum wallboard 120 further includes a fourth side with a fourth gypsum surface 126 opposite the third gypsum surface 122, and covered by a fourth encasing layer 128. Thus, gypsum layer 115 of second gypsum wallboard 120 is disposed between the third encasing layer 124 and the fourth encasing layer 128. In one or more embodiments, the gypsum layer 115 is constructed using traditional gypsum wallboard manufacturing techniques. The gypsum layer 115 of one or more embodiments is formed from a gypsum slurry that is laid onto the fourth encasing layer 128. In such an embodiment, the fourth encasing layer 128 is referred to as the face encasing layer and the third encasing layer 124 is referred to as the back encasing layer. In one embodiment, third encasing layer 124 may be wrapped around the gypsum layer 115 to enclose the gypsum layer and form a single panel with encasing layers on both the face and back side and along both long edges 144.

In one or more embodiments, the gypsum layers 115 of one or both gypsum wallboards 119 and 120 are formed using fiberglass particles and/or have a high density core of at least 1200-1400 lbs/msf and a thickness between ¼ and ⁵⁄₁₆ inch. In such embodiments, the gypsum layer 115 has high strength and allows structural stability to benefit the wallboards 119 and/or 120 during the methods disclosed herein. In one or more embodiments, a gypsum layer 115 of the present disclosure has a thickness between 0.25" (about ¼ inches) and about 0.375" (about ⅜ inches), pref ⁵⁄₁₆". As discussed below, one or more of the encasing layers 114, 118, 124, 128 may be formed with a material or structure to further enhance strength. The enhanced strength of the gypsum layer 115 and/or encasing layers 114, 118, 124, 128 improves acoustical performance and prevents structural failure of each wallboard during encasing layer removal (discussed further below), packaging, shipping, handling, and installation.

Further, one or more embodiments of the present disclosure feature a first encasing layer 114, second encasing layer 118, third encasing layer 124, and/or fourth encasing layer 128 made from paper (e.g., recycled furnish), nonwoven glass mat, nonwoven synthetic fiber mats, or other encasing materials commonly utilized by those with ordinary skill in the art. The encasing layers may further include various wet and/or dry strength additives, antimicrobials, and/or sizing to improve strength and structural performance, as are known in the art. In an embodiment of the present disclosure, the first encasing layer 114 and/or third encasing layer 124 is formed as a thin and/or weak layer, being only as strong as necessary to produce a flat, dimensionally suitable panel, in order to facilitate cutting, breakage, or tearing later of the first encasing layer 114 and/or third encasing layer 124 after the sound damping wallboard is produced, as will be explained in further detail below. In one or more embodiments, the first encasing layer 114 and/or third encasing layer 124 is a paper between about 30 and about 60 lbs. basis weight or between about 30 and about 60 lbs. per thousand square feet of surface area. In an embodiment, the first encasing layer 114 and/or third encasing layer 124 is paper having approximately 45 lbs. basis weight.

The method 10 illustrated in FIG. 1 further includes removing, at step 16, a portion or part of the first encasing layer 114. Referring to FIG. 3, removal of a portion of the first encasing layer 114 partially exposes first gypsum surface 112 and provides or creates a first gypsum surface portion 130 and a first encasing layer portion 132 on the first side of gypsum layer 115. The first gypsum surface portion 130 and/or the first encasing layer portion 132 may be formed as a single contiguous area, or a plurality of non-contiguous areas. In the embodiment illustrated in FIG. 3, the first gypsum surface portion 130 is a single contiguous area and the first encasing layer portion 132 is formed as two noncontiguous areas. The area of first gypsum surface portion 130 may also be larger and cover more surface area than the (combined) area of first encasing layer portion 132. Reducing the relative area covered by the encasing layer portion 132 is believed to facilitate cutting or snapping the sound damping wallboard during installation.

In a preferred embodiment, at least part of the first encasing layer portion 132 is positioned adjacent to one or more edges of first gypsum surface 112. As shown in the embodiment of FIG. 3, a discernible amount of the first encasing layer 114 remains along the opposite longitudinal edges 144 to form first encasing layer portion 132. In one or more embodiments, first encasing layer portion 132 is formed as either a random or as an ordered or regular pattern. In the embodiment shown in FIG. 3, first encasing layer portion 132 is formed as a regular pattern on the first side of gypsum layer 115—i.e. as an ordered pattern of strips or bands parallel or perpendicular to the long edges of the wallboard. Strips parallel to the long edges of the wallboard assist in sealing the long edges, and reduce the need for additional tape or edge banding. As will be explained further, the one or more first encasing layer portions 132 increase adhesion or bonding performance of the first gypsum wallboard 119 to a sound damping adhesive, the sound damping layer, or the second gypsum wallboard 120 through an adhesive. Further, the presence of one or more first gypsum surface portions 130 and one or more first encasing layer portions 132 on the first side of gypsum layer 115 prevents warping of the first gypsum wallboard 119.

In accordance with one or more embodiments of the present disclosure, the method 10 further includes removing, at step 18 of FIG. 1, a portion or part of the third encasing layer 124 to partially expose third gypsum surface 122 and provide a second gypsum surface portion 134 and a third encasing layer portion 136 on the third side of gypsum layer 115 (second gypsum wallboard 120). Similar to gypsum wallboard 119, second gypsum surface portion 134 and/or third encasing layer portion 136 may be formed as a single contiguous area or a plurality of noncontiguous areas. In the embodiment illustrated in FIG. 3, the second gypsum surface portion 134 is formed as a single contiguous area and the third encasing layer portion 136 is formed as two noncontiguous areas. The second gypsum surface portion 134 may be larger and cover more surface area than the (combined) area of the third encasing layer portion 136.

In a preferred embodiment, at least part of the third encasing layer portion 136 is positioned adjacent to one or more edges of third gypsum surface 122. As shown in the embodiment of FIG. 3, a discernible amount of the third encasing layer 124 remains along the opposite longitudinal edges 144 to form third encasing layer portions 136. In one or more embodiments, third encasing layer portion 136 is formed as either a random or as an ordered or regular pattern. In a preferred embodiment, third encasing layer portion 136 is formed with a pattern that is the same or complementary to the pattern of first encasing layer portion 132. As will be explained further, third encasing layer portion 136 increases adhesion or bonding performance of the second gypsum wallboard 120 to a sound damping adhesive, the sound damping layer, or the first gypsum wallboard 119 through an adhesive. Further, the presence of second gypsum surface portion 134 and third encasing layer portion 136 on the third side of gypsum layer 115 prevents warping of the second gypsum wallboard 120.

Figure 4:
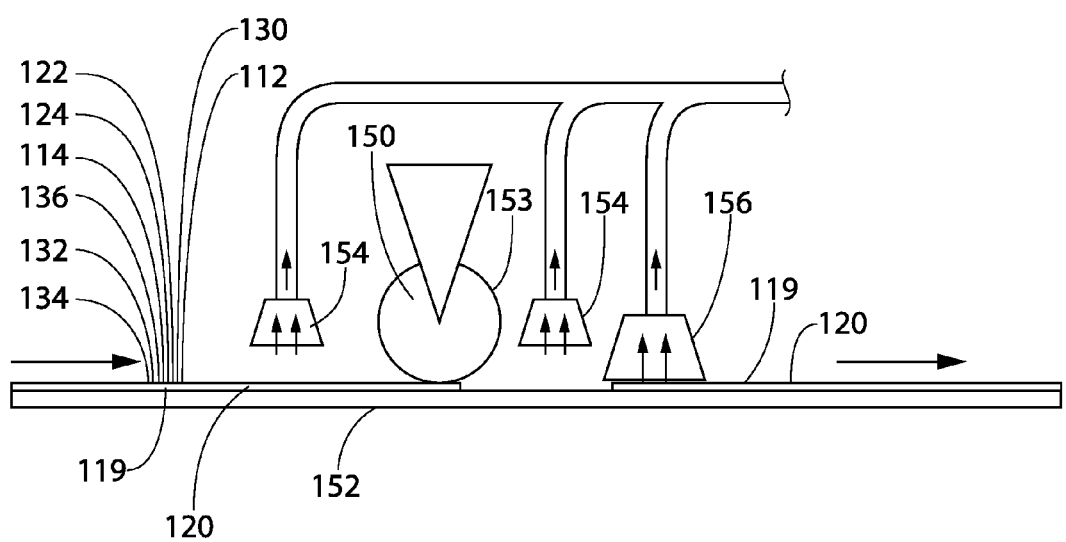
FIG. 4 illustrates a system for forming a sound damping wallboard in accordance with further aspects of the present disclosure.

Referring now to FIG. 4, an embodiment of the present disclosure includes removing a portion or part of the first encasing layer 114 by abrasion. A conveyor, belt, or other transporter 152 moves the first gypsum wallboard 119 toward an abrasive member 150. In an embodiment, the abrasive member 150 includes a rotating or moving surface 153 that moves relative to the first gypsum surface 112 of the first gypsum wallboard 119. In one or more embodiments, the surface 153 includes sand or another abrasive material to enable removal of one or more portions of the first encasing layer 114. In an embodiment, the method 10 further includes cleaning at least one of the first gypsum surface portion 130 and the first encasing layer portion 132. As shown in the embodiment of FIG. 4, one or more vacuum members 154 may be disposed adjacent the abrasive member 150. Further, one or more cleaning vacuum members 156 may also be provided to remove dust, debris, and other matter from the surrounding area and surfaces of the first gypsum wallboard 119.

In an embodiment, the features of the present disclosure illustrated in FIG. 4 are further applied to the second gypsum wallboard 120 with regard to removal of the third encasing layer 124 and cleaning the surrounding area and surfaces.

Figure 5:
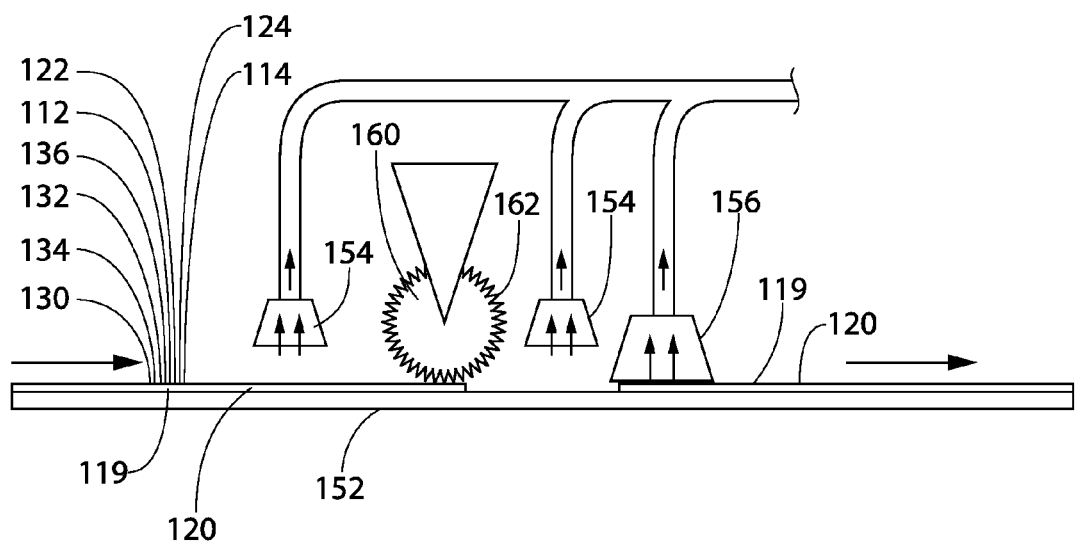
FIG. 5 illustrates a system for forming a sound damping wallboard in accordance with further aspects of the present disclosure.

Referring now to FIG. 5, an alternative embodiment of the present disclosure includes removing the portion of the first encasing layer 114 with a planer 160. A conveyor, belt, or other transporter 152 moves the first gypsum wallboard 119 toward the planer 160. In an embodiment, the planer 160 includes a rotating or moving cutting edge(s) 162 that moves relative to the first side surface 112 of the first gypsum wallboard 119. In one or more embodiments, the planer 160 includes a bladed, slotted, or other type of planer 160 to enable removal of one or more portions of the first encasing layer 114. The planer 160 of one or more embodiments may include single or multiple blades. In an embodiment, the method 10 further includes cleaning at least one of the first gypsum surface portion 130 and the first encasing layer portion 132. As shown in the embodiment of FIG. 5, one or more vacuum members 154 may be disposed adjacent the planer 160. Further, one or more cleaning vacuum members 156 may also be provided to remove dust, debris, and other matter from the surrounding area and surfaces of the first gypsum wallboard 119.

In an embodiment, the features of the present disclosure illustrated in FIG. 5 are further applied to the second gypsum wallboard 120 with regard to removal of the third encasing layer 124 and cleaning the surrounding area and surfaces.

Figure 6:
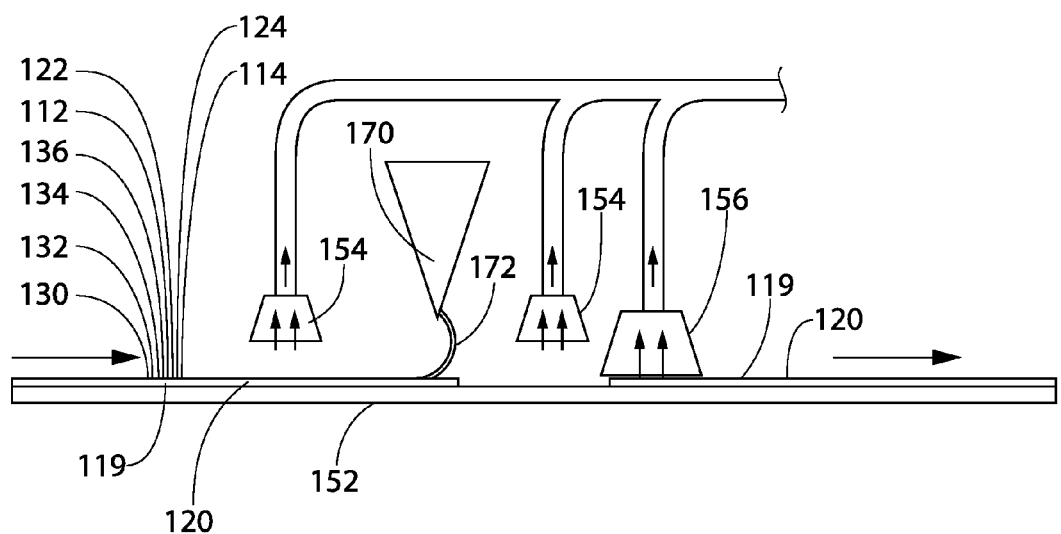
FIG. 6 illustrates a system for forming a sound damping wallboard in accordance with further aspects of the present disclosure.

Referring now to FIG. 6, a further alternative embodiment of the present disclosure includes removing the portion of the first encasing layer 114 by peeling or pulling a portion of the first encasing layer 114 away from the first gypsum surface 112 with a pulling member 170. A conveyor, belt, or other transporter 152 moves the first gypsum wallboard 119 toward the pulling member 170. In an embodiment, the pulling member 170 includes a grabbing mechanism or device 172 to engage and retain a leading edge of one or more portions of the first encasing layer 114 as the first gypsum wallboard 119 moves across the pulling member 170. As the first gypsum wallboard 119 moves, the pulling member 170 peels one or more portions of the first encasing layer 114 away from first gypsum surface 112 to enable removal of one or more portions of the first encasing layer 114. In an embodiment, the method 10 further includes cleaning at least one of the first gypsum surface portion 130 and the first encasing layer portion 132. As shown in the embodiment of FIG. 6, one or more vacuum members 154 may be disposed adjacent the pulling member 170. Further, one or more cleaning vacuum members 156 may be provided to remove dust, debris, and other matter from the surrounding area and surfaces of the first gypsum wallboard 119.

In an embodiment, the features of the present disclosure illustrated in FIG. 6 are further applied to the second gypsum wallboard 120 with regard to removal of the third encasing layer 124 and cleaning the surrounding areas and surfaces.

Referring again to FIGS. 1-3, the method 10 further includes applying, at step 20, a sound damping layer 140 to the first side of gypsum layer 115, to cover first gypsum surface portion 130 and the first encasing layer portion 132. In one or more embodiments of the present invention, the sound damping layer 140 is a sound damping adhesive. The sound damping layer 140 of one or more embodiments is a viscoelastic polymer with a broad Tg range. The sound damping layer 140 of one or more embodiments includes one or more acrylic polymers and copolymers. The sound damping layer 140 of one or more embodiments includes a sound damping layer with sufficient sound damping and adhesive properties to bond the sound damping layer 140 to the first gypsum wallboard 119 and the second gypsum wallboard 120 while improving the STC performance of the previously described framed construction. One of ordinary skill in the art will recognize the various sound damping materials with adhesive properties utilized in the art of sound damping panels that form the sound damping layer 140 of the present disclosure. As shown in FIG. 3, the sound damping layer 140 is applied to the first side of gypsum layer 115, to cover at least part of the first gypsum surface portion 130 and the first encasing layer portion 132. The sound damping layer 140 provides enhanced sound damping performance and sufficiently adheres to the first encasing layer portion 132 to provide enhanced bonding and dimensional stability.

In one embodiment, the sound damping layer 140 is applied between the first side of gypsum wallboard 119 and the third side of gypsum wallboard 120 to form a sound damping wallboard 100. The method further includes positioning, at step 22, the third side of gypsum layer 115 of the second gypsum wallboard 120 to the sound damping layer 140, to couple the first gypsum wallboard 119 to the second gypsum wallboard 120. As shown in FIG. 3, the sound damping layer 140 covers at least part of the second gypsum surface portion 134 and third encasing layer portion 136. The sound damping layer 140 provides enhanced sound damping performance and sufficiently adheres to the first and third encasing layer portions 132 and 136 to provide enhanced bonding and dimensional stability. In an embodiment, the sound damping layer 140 is positioned on the first side of gypsum wallboard 119 and/or the third side of gypsum wallboard 120 as a monolithic, homogenous layer. In a further embodiment, the sound damping layer 140 covers substantially the entire surface of the first side of gypsum wallboard 119 and/or the third side of gypsum wallboard 120, such as shown in FIG. 3.

In one embodiment, the patterns of first and third encasing layer portions 132, 136 are overlapping, such that at least a part of sound damping layer 140 is positioned between first encasing layer portion 132 and third encasing layer portion 136. In a preferred embodiment, first and third encasing layer portions 132, 136 are formed with the same patterns that are aligned with each other when the first and second gypsum wallboards 119, 120 are coupled by the sound damping layer 140 to form sound damping wallboard 100.

In one or more embodiments, the sound damping wallboard 100 may further comprise one or more outer encasing layers (not shown) encasing the composite structure formed by gypsum wallboards 119 and 120 and sound damping material 140, to form a single panel structure and further improve strength of the wallboard 100 for packaging, shipping, handling, and/or installation.

The sound damping wallboard 100 of one or more embodiments has a thickness between about 0.5" and about 0.75". In a preferred embodiment, the sound damping wallboard 100 has a thickness between about ½ inches and about ⅝ inches, to facilitate use of the sound damping wallboard in the same applications as conventional wallboard panels. Without a substantial amount of encasing material at inner layers, the sound damping wallboard 100 is more easily scored, snapped, and/or cut without sacrificing acoustical performance or strength for packaging, shipping, handling, and installation.

As used in the present disclosure, the term "wallboard," especially with regard to the first gypsum wallboard 119, the second gypsum wallboard 120, and the sound damping wallboard 100, generally refers to any panel, sheet, or planar structure, either uniform or formed by connected portions or pieces. The sound damping wallboard 100 shown in the embodiment of FIG. 3 may form part of a vertical building wall or a horizontal building ceiling. Multiple sound damping wallboards 100 may be connected via one or more studs of a wall frame to form a building wall structure. One of ordinary skill will recognize the various methods and structures for fastening, adhering, or otherwise attaching or constructing the components of a wall or ceiling, including studs, plates, panels, wallboards, etc., to form a building wall or ceiling, and such methods and structures are included in the present disclosure.

What is claimed is:

1. A sound damping wallboard, comprising:
    a gypsum layer having a first side with a first gypsum surface;
    a first encasing layer at least partially covering the first gypsum surface to form a first encasing layer portion;
    a sound damping layer on the first side covering at least part of the first encasing layer portion, the sound damping layer having a sound damping layer surface opposite the gypsum layer; and
    an outer encasing layer on the sound damping layer surface.

2. The sound damping wallboard of claim 1, wherein the first encasing layer completely covers the first gypsum surface to form the first encasing layer portion.

3. The sound damping wallboard of claim 1, wherein the first encasing layer has a weight of between about 30 and about 60 pounds per thousand square feet of surface area.

4. The sound damping wallboard of claim 1, wherein the gypsum layer has a thickness of between about 0.25 inches and about 0.375 inches.

5. The sound damping wallboard of claim 1, wherein the gypsum layer has a density of at least 1200 pounds per thousand square feet.

6. The sound damping wallboard of claim 1, wherein the sound damping layer comprises a viscoelastic polymer.

7. A method of forming a sound damping wallboard, comprising the steps of:
    providing a first gypsum layer having a first side with a first gypsum surface, and a first encasing layer covering the first gypsum surface; and
    removing at least part of the first encasing layer to expose the first gypsum surface, form a first gypsum surface portion on the first side, and allow application of a sound damping layer to the first side to cover at least part of the first gypsum surface portion.

8. The method of claim 7, wherein removing at least part of the first encasing layer includes removing by abrasion.

9. The method of claim 8, wherein removing by abrasion includes removing by a moving surface.

10. The method of claim 9, further comprising transporting the first gypsum layer and the first encasing layer to the moving surface.

11. The method of claim 10, wherein the moving surface includes an abrasive material.

12. The method of claim 7, wherein removing at least part of the first encasing layer includes removing by planing.

13. The method of claim 12, wherein removing by planing includes removing by at least one blade.

14. The method of claim 13, further comprising transporting the first gypsum layer and the first encasing layer to the at least one blade.

15. The method of claim 7, wherein removing at least part of the first encasing layer includes removing by peeling.

16. The method of claim 15, wherein removing by peeling includes removing with a pulling member.

17. The method of claim 16, further comprising transporting the first gypsum layer and the first encasing layer to the pulling member.

18. A sound damping wallboard, comprising:
    a gypsum layer having a first side with a first gypsum surface and a second side with a second gypsum surface;
    a first encasing layer at least partially covering the first gypsum surface;
    a second encasing layer at least partially covering the second gypsum surface opposite the first gypsum surface;
    a sound damping layer at the first side of the gypsum layer and at least partially covering the first encasing layer portion, the sound damping layer having a sound damping layer surface opposite the gypsum layer; and
    an outer encasing layer on the sound damping layer surface.

19. The sound damping wallboard of claim 18, wherein the first encasing layer completely cover the first gypsum surface and the second encasing layer completely covers the second gypsum surface.

20. The sound damping wallboard of claim 18, wherein each of the first encasing layer and the second encasing layer has a weight of between about 30 and about 60 pounds per thousand square feet of surface area.

21. The sound damping wallboard of claim 18, wherein the gypsum layer has a thickness of between about 0.25 inches and about 0.375 inches.

22. The sound damping wallboard of claim 18, wherein the gypsum layer has a density of at least 1200 pounds per thousand square feet.

* * * * *